United States Patent
Li et al.

(10) Patent No.: US 11,343,773 B2
(45) Date of Patent: *May 24, 2022

(54) WIRELESS COMMUNICATION METHOD AND DEVICE

(71) Applicant: ALIBABA GROUP HOLDING LIMITED, Grand Cayman (KY)

(72) Inventors: Xiangfu Li, Hangzhou (CN); Wanxi Ren, Hangzhou (CN); Jun Luo, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 110 days.

This patent is subject to a terminal disclaimer.

(21) Appl. No.: 16/846,458

(22) Filed: Apr. 13, 2020

(65) Prior Publication Data
US 2020/0245247 A1   Jul. 30, 2020

Related U.S. Application Data

(63) Continuation of application No. 14/864,472, filed on Sep. 24, 2015, now Pat. No. 10,624,031.

(51) Int. Cl.
*H04W 64/00* (2009.01)
*H04W 52/02* (2009.01)
(Continued)

(52) U.S. Cl.
CPC ....... *H04W 52/0229* (2013.01); *H04W 4/029* (2018.02); *H04W 4/06* (2013.01);
(Continued)

(58) Field of Classification Search
None
See application file for complete search history.

(56) References Cited

U.S. PATENT DOCUMENTS 9,031,540 B2 * 5/2015 Mathews ................ H04M 3/00
                                                                455/411
9,258,695 B2   2/2016 Kasslin et al.
(Continued)

FOREIGN PATENT DOCUMENTS

CN       101965710 A    2/2011
CN       102056078 A    5/2011
(Continued)

OTHER PUBLICATIONS

PCT International Search Report and Written Opinion dated Feb. 2, 2016, issued in corresponding International Application No. PCT/US15/51886 (12 pages).
(Continued)

*Primary Examiner* — Sai Aung
(74) *Attorney, Agent, or Firm* — Finnegan, Henderson, Farabow, Garrett & Dunner, LLP

(57) ABSTRACT

A wireless communication method is provided. The method includes sending, by a wireless communication device, a broadcast message to a terminal device. The broadcast message may include device identification information of the wireless communication device. The method may further include receiving, by the wireless communication device, a scan request message sent by the terminal device. The method may further include sending, by the wireless communication device, a scan response message to the terminal device in response to receiving the scan request message. The scan response message may include attribute data associated with the wireless communication device, and the attribute data may include identification information of content associated with a physical location of the wireless communication device.

9 Claims, 9 Drawing Sheets

(51) Int. Cl.
*H04W 4/80* (2018.01)
*H04W 4/23* (2018.01)
*H04W 4/029* (2018.01)
*H04W 4/06* (2009.01)
*H04W 8/00* (2009.01)
*H04W 84/18* (2009.01)

(52) U.S. Cl.
CPC ............... *H04W 4/23* (2018.02); *H04W 4/80* (2018.02); *H04W 8/005* (2013.01); *H04W 64/00* (2013.01); *H04W 84/18* (2013.01); *Y02D 30/70* (2020.08)

(56) References Cited

U.S. PATENT DOCUMENTS

| | | |
|---|---|---|
| 9,319,828 B2 | 4/2016 | Decuir et al. |
| 2002/0037700 A1 | 3/2002 | Dooley et al. |
| 2002/0077896 A1 | 6/2002 | Liu et al. |
| 2004/0266350 A1 | 12/2004 | Kim |
| 2007/0266395 A1* | 11/2007 | Lee .................. H04H 60/31 725/11 |
| 2007/0287476 A1* | 12/2007 | Jeong .................. H04W 76/10 455/456.6 |
| 2008/0176583 A1* | 7/2008 | Brachet ................. G01S 5/0236 455/456.3 |
| 2009/0234728 A1 | 9/2009 | Willuns et al. |
| 2010/0057563 A1* | 3/2010 | Rauber .................. G06Q 30/02 705/14.53 |
| 2011/0014868 A1 | 1/2011 | Yun et al. |
| 2011/0306357 A1* | 12/2011 | Alizadeh-Shabdiz ............. G01S 1/024 455/456.1 |
| 2012/0045994 A1 | 2/2012 | Koh et al. |
| 2012/0195387 A1 | 8/2012 | Masuda |
| 2013/0065584 A1 | 3/2013 | Lyon et al. |
| 2013/0072248 A1 | 3/2013 | Bajko |
| 2013/0184003 A1* | 7/2013 | Alizadeh-Shabdiz ............. G06Q 10/0875 455/456.1 |
| 2013/0188538 A1 | 7/2013 | Kainulainen et al. |
| 2013/0308618 A1* | 11/2013 | Panneerselvam ......... G01S 5/14 370/338 |
| 2014/0018110 A1* | 1/2014 | Yoakum ................ H04W 64/00 455/456.5 |
| 2014/0220883 A1 | 8/2014 | Emigh et al. |
| 2015/0026360 A1 | 1/2015 | Hrabak |
| 2015/0206190 A1 | 7/2015 | Lee et al. |
| 2015/0355875 A1 | 12/2015 | Matsushita et al. |

FOREIGN PATENT DOCUMENTS

| | | |
|---|---|---|
| CN | 102546792 A | 7/2012 |
| CN | 102780513 A | 11/2012 |
| CN | 103491117 A | 1/2014 |
| CN | 103793833 A | 5/2014 |
| CN | 104066089 A | 9/2014 |
| CN | 105228091 A | 1/2016 |
| WO | WO-2014/135711 A1 | 9/2014 |

OTHER PUBLICATIONS

Extended European Search Report in European Application No. 15846961.9-1870, pursuant to Rule 62 EPC, the Supplementary European Search Report (Art 153(7) EPC) and the European Search Opinion, dated Aug. 24, 2017.
First Chinese Search Report issued in Chinese Application No. CN2014105219871, dated May 3, 2018, 1 pages.
SIPO First Chinese Office Action issued in Chinese Application No. 201410521987.1, dated May 30, 2018, 14 pages.

* cited by examiner

700

800

WIRELESS COMMUNICATION METHOD AND DEVICE

CROSS-REFERENCE TO RELATED APPLICATION

This application is a continuation of U.S. patent application Ser. No. 14/864,472, filed Sep. 24, 2015, which is based upon and claims priority to Chinese Patent Application No. 201410521987.1, filed Sep. 30, 2014, the entire content all of which is incorporated herein by reference.

TECHNICAL FIELD

The present application relates to the field of communication technologies and, more particularly, to a wireless communication method and apparatus.

BACKGROUND

Bluetooth Low Energy (BLE) is a low-cost, short-distance, and interoperable wireless technology that has been adopted in the Bluetooth protocol version 4.0. BLE provides attractive features including low power consumption, long battery life, and enhanced communication range for BLE enabled devices.

iBeacon is an indoor BLE-based positioning technology introduced by the Apple Company in June 2013. The iBeacon technology defines a broadcast message format transmitted by a BLE enabled device, which may be referred to as an iBeacon message. A wireless communication device capable of conforming to the iBeacon technical specification may be referred to as an iBeacon device. The iBeacon message generally includes a Universally Unique Identifier (UUID) used for uniquely identifying a wireless communication device, a major identifier (Major ID), and a minor identifier (Minor ID).

An iBeacon device broadcasts iBeacon messages at a certain time interval. A terminal device supporting the BLE technology (such as an IOS device) may receive the broadcast message through monitoring, decode the broadcast message to obtain identification information of the iBeacon device, and determine a distance between the terminal device and the iBeacon device based on signal strength of the received broadcast message. Information carried in the broadcast message is strictly defined in iBeacon technical specification, and if there is any modification or addition to the information of the broadcast message, the terminal device would not be able to decode the message correctly, resulting in a positioning failure.

In the iBeacon technology, the positioning function is implemented through associating the identification information of the wireless communication device with a physical location, and the physical location may indicate an advertisement screen of a department store, a pair of shoes in a store, a statue in a scenic spot, and so on. The physical location may often have a variable attribute. For example, an advertisement screen in a department store may show different advertisements at different time. As the format of the iBeacon broadcast message has been standardized by the protocol specification, it is not feasible to include variable attribute data in the broadcast message, and the broadcast message by itself does not indicate whether the attribute data of the physical location is changed.

Generally, a BLE connection may be established between a terminal device and a wireless communication device to communicate the variable attribute data associated with the wireless communication device. However, since the BLE connection is a point-to-point connection, a wireless communication device would not be able to broadcast the attribute data to multiple terminal devices simultaneously, causing delay of transmitting the attribute data. Moreover, power consumption of the wireless communication device in a BLE connection state is significantly greater than that of a broadcast state. Establishing BLE connections to transmit the variable attribute data would increase power consumption of the wireless communication device substantially.

SUMMARY

The present disclosure provides a wireless communication method. Consistent with some embodiments, the method includes sending, by a wireless communication device, a broadcast message to a terminal device. The broadcast message may include device identification information of the wireless communication device. The method may further include receiving, by the wireless communication device, a scan request message sent by the terminal device. The method may further include sending, by the wireless communication device, a scan response message to the terminal device in response to receiving the scan request message. The scan response message may include attribute data associated with the wireless communication device, and the attribute data may include identification information of content associated with a physical location of the wireless communication device.

Consistent with some embodiments, this disclosure provides another wireless communication method. The method includes receiving, by a terminal device, a broadcast message sent by a wireless communication device. The broadcast message may include device identification information of the wireless communication device. The method may further include sending, by the terminal device, a scan request message to the wireless communication device after receiving the broadcast message, and receiving, by the terminal device, a scan response message sent by the wireless communication device. The scan response message may include attribute data associated with the wireless communication device, and the attribute data may include identification information of content associated with a physical location of the wireless communication device.

Consistent with some embodiments, this disclosure provides another wireless communication method. The method includes sending, by a wireless communication device, a broadcast message to a terminal device. The broadcast message may include device identification information of the wireless communication device. The method may further include receiving, by the wireless communication device, a scan request message sent by the terminal device. The scan request message may include a request for acquiring content associated with media information being played in a media information playing device. The media information playing device may store a correspondence table including identification information of the content. The method may further include determining, according to the correspondence table, the identification information of the content, and sending, by the wireless communication device, a scan response message to the terminal device in response to receiving the scan request message. The scan response message may include the identification information of the content.

Consistent with some embodiments, this disclosure provides a wireless communication device. The wireless communication device includes a sending unit configured to send a broadcast message to a terminal device. The broadcast message may include device identification information of the wireless communication device. The wireless communication device may further include a receiving unit configured to receive a scan request message sent by the terminal device. The sending unit may be further configured to send to the terminal device a scan response message in response to receiving the scan request message. The scan response message may include attribute data associated with the wireless communication device, and the attribute data may include identification information of content associated with a physical location of the wireless communication device.

Consistent with some embodiments, this disclosure provides a terminal device. The terminal device includes a receiving unit configured to receive a broadcast message sent by a wireless communication device. The broadcast message may include device identification information of the wireless communication device. The terminal device may further include a sending unit configured to send a scan request message to the wireless communication device after the receiving unit receives the broadcast message. The receiving unit may be further configured to receive a scan response message sent by the wireless communication device. The scan response message may include attribute data associated with the wireless communication device, and the attribute data may include identification information of content associated with a physical location of the wireless communication device. The terminal device may further include an acquiring unit configured to acquire the content based on the attribute data.

Consistent with some embodiments, this disclosure provides another wireless communication device. The wireless communication device includes a sending unit configured to send a broadcast message to a terminal device. The broadcast message may include device identification information of the wireless communication device. The wireless communication device may further include a receiving unit configured to receive a scan request message sent by the terminal device. The scan request message may include a request for acquiring content associated with media information being played in a media information playing device. The media information playing device may store a correspondence table including identification information of the content. The wireless communication device may further include a processing unit configured to determine, according to the correspondence table, the identification information of the content. The sending unit may be further configured to send to the terminal device a scan response message in response to receiving the scan request message. The scan response message may include the identification information of the content.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Consistent with some embodiments of this disclosure, the wireless communication method and device provided herein may be applied to a BLE enabled communication device, such as an iBeacon device, a Beacon base station (xBeacon), or a terminal device. The terminal device described in the present disclosure may be configured with functionalities supporting the BLE technology. An iBeacon device and an IOS terminal device are mentioned in the present disclosure merely as examples to illustrate the provided embodiments, and the present disclosure is not intended to limit thereto.

Figure 1:
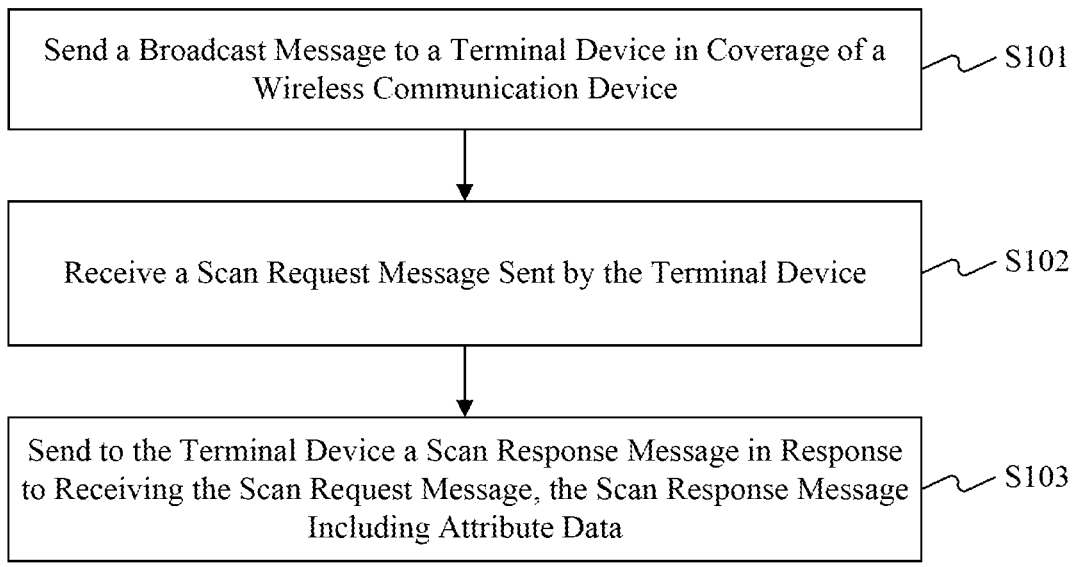
FIG. 1 is a flowchart of an exemplary wireless communication method, consistent with some embodiments of this disclosure.

FIG. 1 is a flowchart of an exemplary wireless communication method 100, consistent with some embodiments of this disclosure. The exemplary method 100 may be performed by a wireless communication device, such as a BLE enabled device, an iBeacon device, or the like. Referring to FIG. 1, the method 100 includes the following steps.

In step S101, the wireless communication device sends a broadcast message to a terminal device in coverage of the wireless communication device.

The broadcast message includes device identification information of the wireless communication device. For example, the device identification information may include a Universally Unique Identifier (UUID), a major identifier (Major ID), a minor identifier (Minor ID), and/or a combination thereof.

Figure 2:
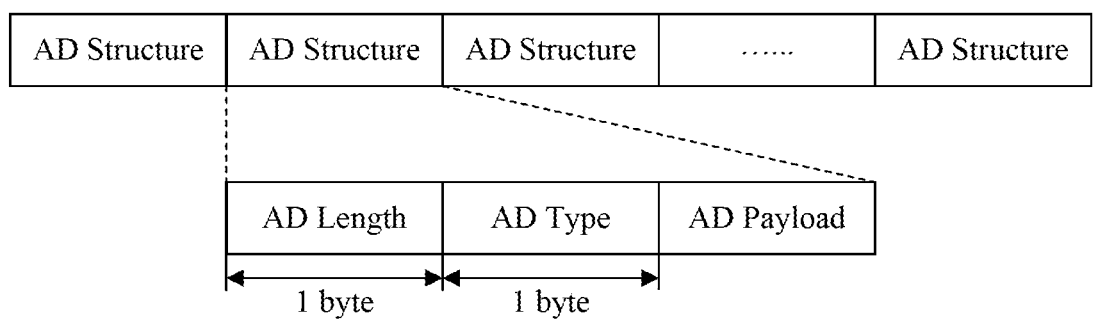
FIG. 2 is a schematic diagram illustrating a broadcast message format, consistent with some embodiments of this disclosure.

FIG. 2 is a schematic diagram illustrating a broadcast message format 200, consistent with some embodiments of this disclosure. In some implementations, the format of the broadcast message may be similar to the advertising frame defined in the BLE protocol, which includes identification information of the wireless communication device. As shown in FIG. 2, the broadcast message may include 0-N Advertisement (AD) Structures, where each AD Structure may include a data length field (AD Length), a data type field (AD Type), and a payload field (AD Payload). The maximum length of a broadcast message may be set to 31 bytes. For example, a broadcast message specified in the iBeacon protocol includes 2 AD Structures, and the length of the broadcast message is set to be 30 bytes.

The data of the iBeacon may be written into the AD Payload, including a UUID, a Major ID, a Minor ID, a Measured Power, or the like. The UUID is a 128-bit identifier serving as a unique identification of an iBeacon device or a group of iBeacon devices. The UUID is generally used to identify an enterprise and an organization, such as a department store, a chain store, or the like.

The Major ID and the Minor ID are 16-bit identifiers that may be self-defined and be used to identify each separate iBeacon device. For example, when an iBeacon device is used in chain stores, the UUID may be the same identifying the store brand, the Major ID may identify a region of the store, and the Minor ID may identify an ID of the specific store.

The Measured Power field indicates a reference received signal strength, and a receiver may calculate a distance to the iBeacon device based on the reference received signal strength.

A unique iBeacon device may be identified by using a UUID, a Major ID and a Minor ID in combination, and each iBeacon device may represent a physical location in the real world. In some implementations, a physical location may be determined based on partial information in the iBeacon message, if the partial information forms a unique identifier in a corresponding database. For example, where a server merely includes content of iBeacon devices in a small region, the iBeacon devices may share the same UUID, and the content may only include Major IDs and Minor IDs of the iBeacon devices. In this scenario, a specific physical location may be determined by using a combination of a Minor ID and a Major ID.

When a wireless communication device (such as an iBeacon device) is placed at a certain location, the identification information of the wireless communication device is registered to a server, and a mapping relation between the identification information and a physical location is stored in a database of the server. For example, when a particular store sells certain category of shoes at the corresponding physical location, such information may be registered and stored in the server.

The iBeacon device broadcasts its device identification information periodically in a broadcast message, and a terminal device (such as an IOS device) entering the transmission coverage of the iBeacon device may receive the broadcast message. By matching a UUID, a Major ID and a Minor ID, the terminal device may identify a nearby iBeacon device, and receive information of the physical location corresponding to the iBeacon device.

In some implementations, a message may be pushed to the terminal device for location-specific promotion. For example, a clothing store is provided with an iBeacon wireless communication device, and may periodically send iBeacon broadcast messages. When a user of a mobile phone installed with an iBeacon application (APP) passes by the clothing store, the mobile phone may receive a broadcast message by the iBeacon device and obtain an ID of the clothing store. The mobile phone may then access a server which pre-stores the ID of the clothing store and corresponding promotion information, and the server may send the promotion information of the store to the mobile phone for displaying through the APP. For example, the server may send special offers, such as "There is a sweater you've praised at XX guide website in XX store 20 meters in front of you", "The black one-piece of xx brand you've browsed for 8 times is 50% off today", to the mobile device. After the user enters the store and approaches a certain commodity, the server may send further information about the commodity and display the information through the APP.

In step S102, the wireless communication device receives a scan request message sent by the terminal device. The scan request message is sent by the terminal device in response to receiving the broadcast message and may be a unicast message.

In step S103, in response to receiving the scan request message, the wireless communication device sends a scan response message to the terminal device. The scan response message includes attribute data which includes identification information of content associated with a physical location where the wireless communication device is located. The attribute data may include static attribute data and/or variable attribute data. Correspondingly, the terminal device acquires the content associated with the physical location where the wireless communication device is located, according to the attribute data.

In some embodiments, the attribute data may include variable attribute data. For example, when the iBeacon device is disposed at a display screen of a department store, the display screen plays different advertisement content during different time periods. In this scenario, the attribute data may relate to a media file of the advertisement content being currently played, such as a player ID (playerID) and a content ID (contentID), and the user of the mobile phone may acquire, according to the attribute data (such as the contentID), a corresponding URL from the server and open the URL. As another example, when a group of iBeacon devices are disposed in a store of a merchant, the merchant may provide different special offers during different time periods, and content of the special offers may be used as the attribute data and be included in the scan response message.

The format of the scan response message may be defined similar to the format of the broadcast message shown in FIG. 2. For example, the maximum length of the scan response message may be set to 31 bytes, and the maximum length of an AD Payload may be set to 29 bytes. Thus, the iBeacon device may transmit 29 bytes of the attribute data, thereby informing the terminal device of the dynamic attribute information.

In some embodiments, when the attribute of the wireless communication device changes, the wireless communication device may update the attribute data in the scan response message and send an updated scan response message when another scan request message is received at a later time.

For example, when advertisement content played on the screen of the department store changes, the attribute data is changed, and the iBeacon device may update the attribute data to the server in real time, and update the scan response message such that an updated scan response message may be sent to the terminal device when a scan request message is received from the terminal device next time. As a result, the terminal device may acquire the updated data from the server according to the updated scan response message. Similarly, when the position of a pair of shoes in the store is changed, or a different object is placed at the same position, the terminal device may be informed by using the above manner of updating the attribute data in real time, thereby improving the capability of the iBeacon device sending variable data.

In some embodiments, the scan response message may further include second identification information, such that the terminal device receiving the scan response message may determine its location according to the second identification information and the device identification information. The second identification information may include a Major ID, a Minor ID, or a combination of both.

The second identification information may be partially or entirely overlapping with the device identification information in the broadcast message. For example, when the Major ID and the Minor ID in the second identification information overlap with those of the device identification information, the terminal device may determine identification information of the wireless communication device as a union set of the second identification information and the device identification information. The terminal device may further search, according to the identification information of the wireless communication device, the database on the server to determine the location of the terminal device, where the database includes a mapping relation between the identification information of the wireless communication device and a physical location.

Figure 3:
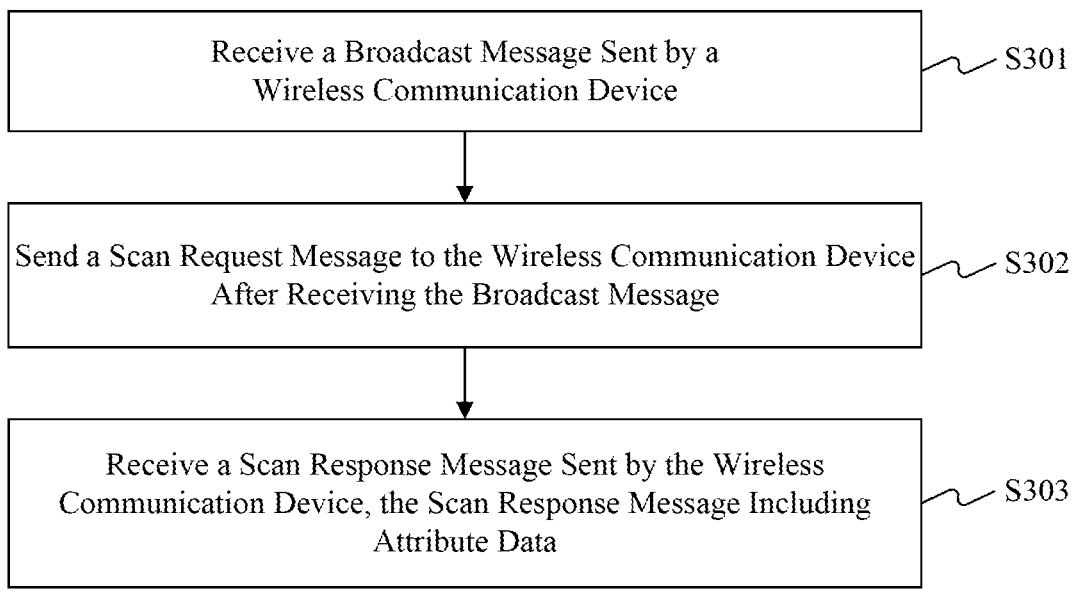
FIG. 3 is a flowchart of another exemplary wireless communication method, consistent with some embodiments of this disclosure.

FIG. 3 is a flowchart of another exemplary wireless communication method 300, consistent with some embodiments of this disclosure. The exemplary method 300 may be performed by a terminal device, such as an IOS device or other devices supporting BLE technology. Referring to FIG. 3, the method 300 includes the following steps.

In step S301, the terminal device receives a broadcast message sent by a wireless communication device. The broadcast message includes device identification information of the wireless communication device, and the device identification information may include a UUID, a Major ID, a Minor ID or a combination thereof. The broadcast message is described above in connection with step S101 of FIG. 1 and is not repeated herein.

In step S302, the terminal device sends a scan request message to the wireless communication device in response to receiving the broadcast message. For example, the terminal device, an IOS device, may be triggered to send a unicast scan request message to an iBeacon device after receiving the broadcast message. In some implementations, this step may be performed by using a software program. For example, an APP of an iBeacon application is installed in the terminal device, such that when the terminal device turns on the Bluetooth, the terminal device is triggered to send the scan request message after receiving the broadcast message, and is switched from a passive scanning state to a transmission state for sending a scan request.

In step S303, the terminal device receives a scan response message sent by the wireless communication device, where the scan response message includes attribute data. The attribute data may include identification information of content associated with a physical location where the wireless communication device is located. After receiving the scan response message, the terminal device may acquire, according to the attribute data, the content associated with the physical location where the wireless communication device is located. In some embodiments, the scan response message may further include second identification information of the wireless communication device, and the second identification information may include a Major ID, a Minor ID, or a combination of both. The scan response message and attribute data are described above in connection with step S103 of FIG. 1 and are not repeated herein.

After the terminal device receives the scan response message sent by the wireless communication device, the terminal device may determine identification information of the wireless communication device according to the device identification information in the broadcast message and the second identification information in the scan response message. The terminal device may search, according to the identification information of the wireless communication device, a database to determine the physical location of the terminal device, where the database may include a mapping relation between the identification information of the wireless communication device and a physical location. In doing so, the terminal device may acquire the UUID, the Major ID, the Minor ID, and the attribute data according to the received broadcast message and the scan response message, so as to retrieve the current physical location information and attribute information in the physical location.

Figure 4:
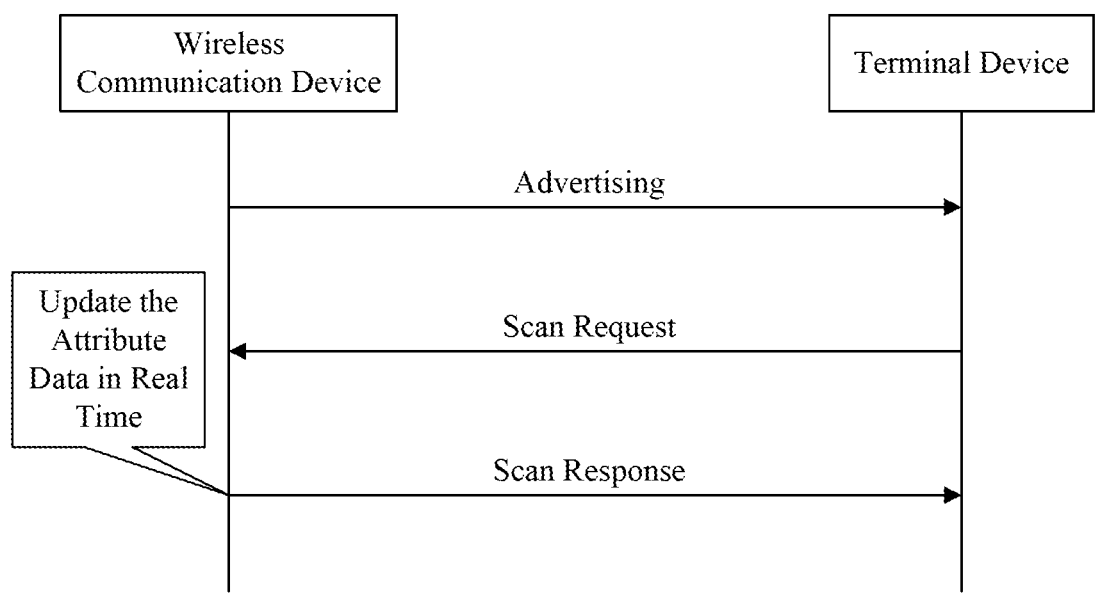
FIG. 4 is a flow diagram of an exemplary wireless communication method, consistent with some embodiments of this disclosure.

FIG. 4 is a flow diagram of an exemplary wireless communication method 400, consistent with some embodiments of this disclosure. As shown in FIG. 4, in the exemplary method 400, a scan response message is transmitted from a wireless communication device to a terminal device in response to receiving the scan request message. The processing performed at the wireless communication device and terminal device is described above in connection with FIG. 1 and FIG. 3 respectively, which is not repeated herein.

Figure 5:
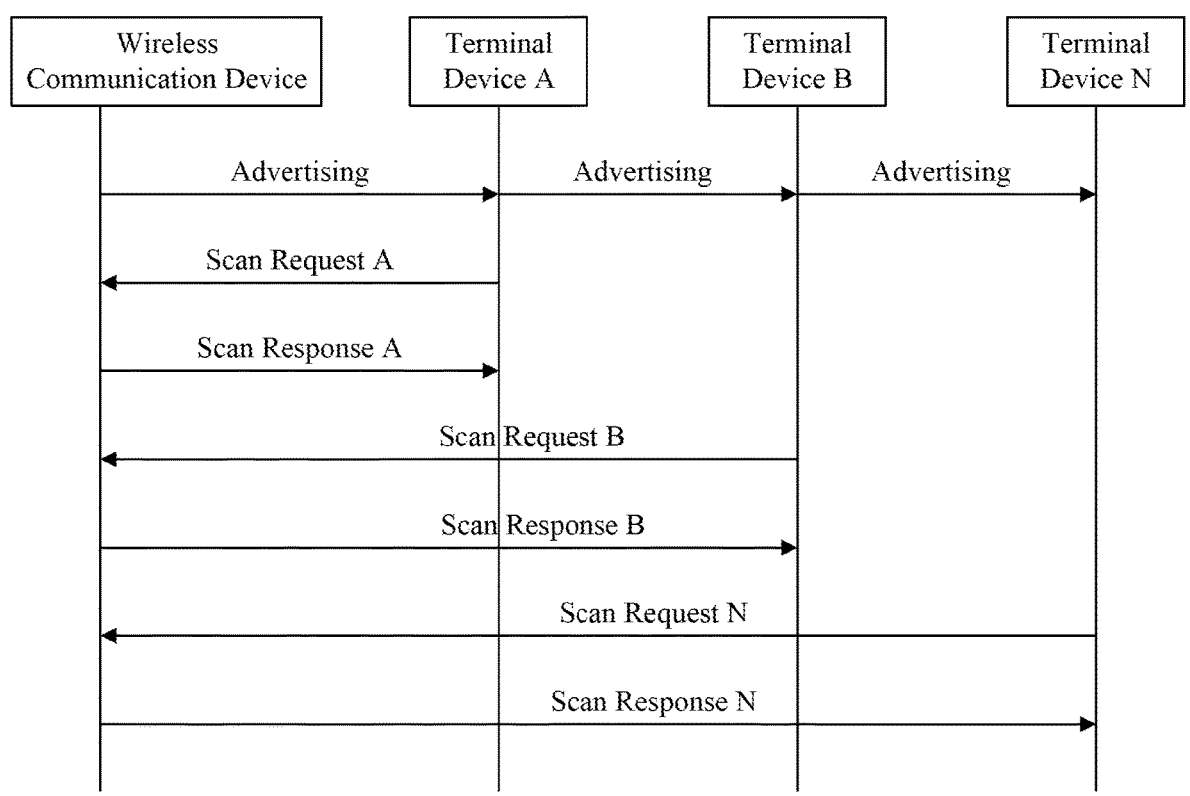
FIG. 5 is a flow diagram of another exemplary wireless communication method, consistent with some embodiments of this disclosure.

FIG. 5 is a flow diagram of another exemplary wireless communication method 500, consistent with some embodiments of this disclosure. As show in FIG. 5, when multiple terminal devices are located in the coverage of the same wireless communication device, a broadcast message of the wireless communication device may be sent to the multiple terminal devices simultaneously, and each terminal device receiving the broadcast message is triggered to send a scan request message to the wireless communication device, thereby achieving point-to-multipoint communication.

The wireless communication methods provided in the present disclosure include transmitting attribute data in a scan response message of a BLE protocol, thereby enhancing the capability of a wireless communication device to send attribute data. In doing so, the wireless communication device may communicate a dynamic physical location attribute with terminal devices in real time while maintaining low power consumption of the wireless communication device in not having to establish a BLE connection.

In some implementations, the communication methods provided in the present disclosure may be applied to a media information playing device, including an offline media playing device, such as a large-screen playing device mounted at a subway station, an airport, a department store, or the like, so as to facilitate the user acquiring media information being played by the media information playing device. Identification information of the media information may be provided to the terminal device, and the user may acquire the media information through the terminal device. For example, when the media information playing device is playing an advertisement of a certain commodity, a terminal device of the user may display a detailed page related to the commodity at a certain e-commerce transaction platform, including information such as sales and price. Offline media playing generally includes two common implementations: (1) a display device provided with a player plus a storage media, such as a USB disk, an SD card, and a mobile hard disk; (2) a display device plus a separate playing device, and the separate playing device may include a video rod, a media box, a PC, a smart TV and the like.

Figure 6:
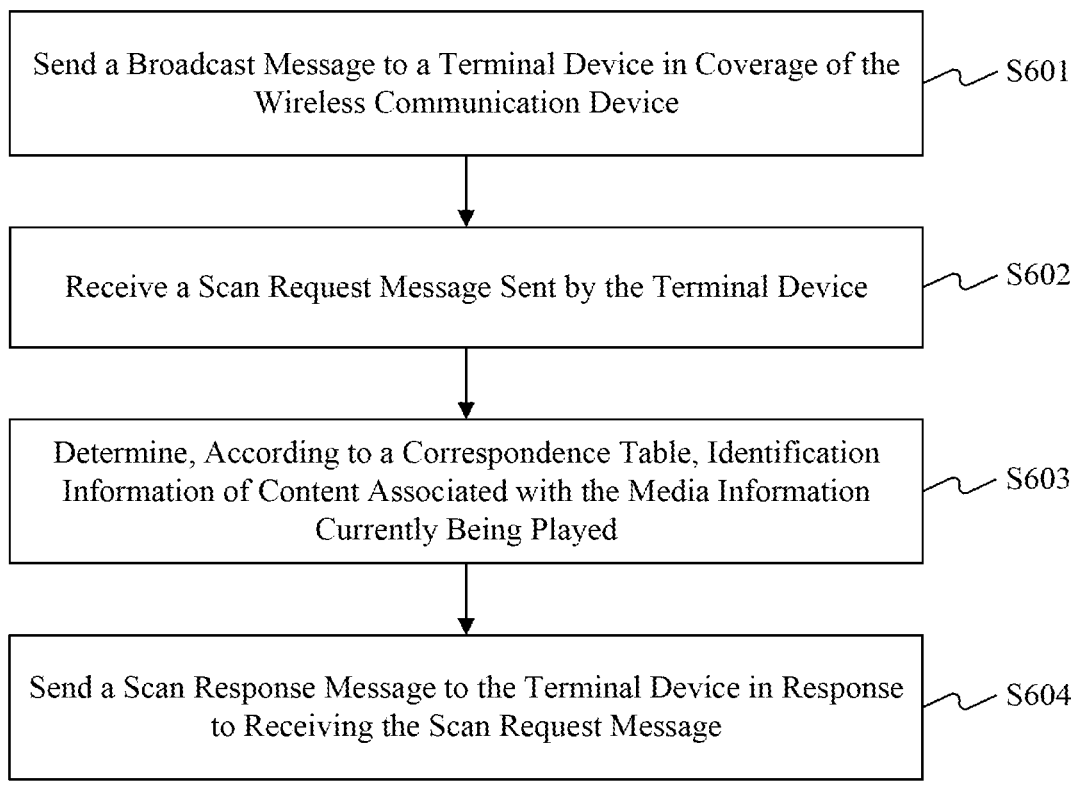
FIG. 6 is a flowchart of another exemplary wireless communication method, consistent with some embodiments of this disclosure.

FIG. 6 is a flowchart of another exemplary wireless communication method 600, consistent with some embodiments of this disclosure. The exemplary method 600 may be performed by a media information playing device equipped with a wireless communication device herein. The media information playing device may store at least one piece of media information and store a correspondence table including identification information of the media information. Referring to FIG. 6, the method 600 includes the following steps.

In step S601, the wireless communication device sends a broadcast message to a terminal device in coverage of the wireless communication device. The broadcast message includes device identification information of the wireless communication device.

In step S602, the wireless communication device receives a scan request message sent by the terminal device. The scan request message may include a request of acquiring content associated with the media information being currently played in the media information playing device.

In some implementations, when the user opens an APP in the terminal device, the terminal device may be triggered to send a scan request message to the wireless communication device after receiving the broadcast message, so as to acquire content associated with the media information being currently played in the media information playing device.

In step S603, the wireless communication device determines, according to the correspondence table, identification information of the content associated with the media information being currently played. After receiving the scan request message, the wireless communication device may determine the media information being currently played and the identification information of the content corresponding to the media information according to the pre-set correspondence table.

The correspondence table may be pre-stored in the media information playing device, and there may be various kinds of identification information of the content stored in the correspondence table. For example, the identification information may include a title of the content associated with the media information, and after the title is provided to the terminal device, the terminal device may start a pre-configured search engine to search by using the title as a key word, so as to acquire detailed information of the content. As another example, the identification information may include a network address (such as a URL) of the content, and after the network address is provided to the terminal device, the terminal device may directly acquire detailed information of the content by accessing the URL.

In some embodiments, the identification information of the content may also be expressed by predefined ID information. In doing so, the size of the message may be reduced when the identification information is sent to the terminal device. For example, an ID may be distributed to the media information in advance and stored in the correspondence table. After acquiring the ID of the content, the terminal device may send a request to a server which stores an association relation such as an association relation between the ID and a network address of the content. The server may return a network address of the content associated with the ID to the terminal device such that the terminal device may acquire the detailed information of the content by using the network address.

In step S604, the wireless communication device sends a scan response message to the terminal device in response to receiving the scan request message. The scan response message includes identification information of the content, such that the terminal device may acquire the content according to the identification information. For example, the content may be a detailed page of a certain commodity object at a certain e-commerce transaction platform, which may include information that may be of interest to the user, such as a price and user comments.

In some embodiments, the scan response message may include a network address of the content, such that the terminal device may acquire the content through accessing the network address. In other embodiments, the scan response message may include ID information of the content, such that the terminal device may acquire the network address of the content from the server by using the ID information and acquire the content through accessing the network address.

In the method 600, the wireless communication device may broadcast device identification information periodically through broadcasting, and it is not required to establish a BLE connection between the wireless communication device and the terminal device, allowing the user to conveniently acquire other content associated with the media information being played in the playing device.

Figure 7:
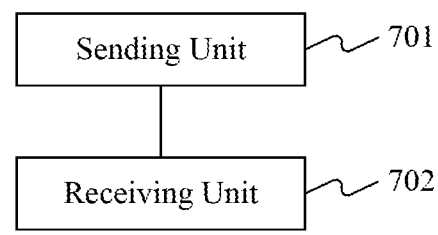
FIG. 7 is a block diagram of an exemplary wireless communication device, consistent with some embodiments of this disclosure.

FIG. 7 is a block diagram of an exemplary wireless communication device 700, consistent with some embodiments of this disclosure. Referring to FIG. 7, the wireless communication device 700 includes a sending unit 701 and a receiving unit 702.

The sending unit 701 is configured to send a broadcast message to a terminal device in coverage of the wireless communication device 700. The broadcast message includes device identification information of the wireless communication device, and the device identification information includes a UUID, a Major ID, a Minor ID, or a combination thereof.

The receiving unit 702 is configured to receive a scan request message sent by the terminal device. The scan request message may be sent by the terminal device in response to receiving the broadcast message.

The sending unit 701 is further configured to send to the terminal device a scan response message in response to receiving the scan request message. The scan response message may include attribute data associated with the physical location of the wireless communication device 700.

In some embodiments, the wireless communication device may further include an updating unit (not shown in the figure). The updating unit is configured to update the attribute data of the scan response message in real time when an attribute of the wireless communication device changes, such that the sending unit 601 sends an updated scan response message when the receiving unit 702 receives a scan request message next time.

The scan response message sent by the sending unit 701 may further include second identification information, such that the terminal device receiving the scan response message may determine the location of the terminal device according to the second identification information and the device identification information. The second identification information may include a Major ID, a Minor ID, or a combination of both.

In some embodiments, the wireless communication device 700 may further include a registering unit (not shown in the figure) configured to register the device identification information to a server, such that the server may store a mapping relation between the device identification information and a physical location in a database.

Figure 8:
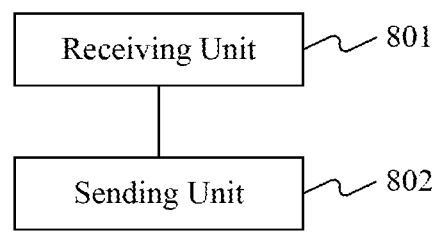
FIG. 8 is a block diagram of an exemplary terminal device, consistent with some embodiments of this disclosure.

FIG. 8 is a block diagram of an exemplary terminal device 800, consistent with some embodiments of this disclosure. Referring to FIG. 8, the terminal device 800 includes a receiving unit 801 and a sending unit 802.

The receiving unit 801 is configured to receive a broadcast message sent by a wireless communication device. The broadcast message includes device identification information of the wireless communication device, and the device identification information includes a UUID, a Major ID, a Minor ID, or a combination thereof.

The sending unit 802 is configured to send a scan request message to the wireless communication device after the receiving unit 801 receives the broadcast message.

The receiving unit 801 is further configured to receive a scan response message sent by the wireless communication device, where the scan response message may include attribute data associated with the wireless communication device. The scan response message received by the receiving unit 801 may further include second identification information of the wireless communication device, where the second identification information may include a Major ID, a Minor ID, or a combination of both.

In some embodiments, the terminal device 800 may further include a determining unit and a searching unit (not shown in the figure). The determining unit is configured to determine identification information of the wireless communication device according to the device identification information in the broadcast message and the second identification information in the scan response message, after the receiving unit 801 receives the scan response message.

The searching unit is configured to search a database to determine the location of the terminal device according to the identification information of the wireless communication device determined by the determining unit. The database may include a mapping relation between the identification information of the wireless communication device and a physical location.

Figure 9:
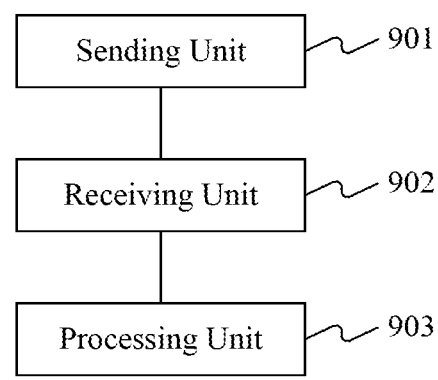
FIG. 9 is a block diagram of another exemplary wireless communication device, consistent with some embodiments of this disclosure.

FIG. 9 is a block diagram of another exemplary wireless communication device 900, consistent with some embodiments of this disclosure. The wireless communication device may be implemented to be a part or all of a media information playing device. Referring to FIG. 9, the wireless communication device 900 includes a sending unit 901, a receiving unit 902, and a processing unit 903.

The sending unit 901 is configured to send a broadcast message to a terminal device in coverage of the wireless communication device, where the broadcast message includes device identification information of the wireless communication device.

The receiving unit 902 is configured to receive a scan request message sent by the terminal device, where the scan request message includes a request for acquiring content associated with media information being currently played in a media information playing device.

The processing unit 903 is configured to determine, according to a correspondence table, identification information of the content associated with the media information being currently played.

The sending unit 901 is further configured to send to the terminal device a scan response message in response to receiving the scan request message. The scan response message includes identification information of the content, such that the terminal device may acquire the content according to identification information.

The wireless communication methods and devices provided in the present disclosure transmit attribute data in a scan response message of a BLE protocol, thereby enhancing the capability of a wireless communication device to send attribute data. In doing so, the wireless communication device may communicate a dynamic physical location attribute with terminal devices in real time while maintaining low power consumption of the wireless communication device in not having to establish a BLE connection.

In exemplary embodiments, a non-transitory computer-readable storage medium including instructions is also provided, and the instructions may be executed by a device (such as a terminal device, a server, a personal computer, or the like), for performing the above-described methods. The device may include one or more processors (CPUs), an input/output interface, a network interface, and/or a memory. For example, the non-transitory computer-readable storage medium may be read-only memory (ROM), random access memory (RAM), Compact Disc Read-Only Memory (CD-ROM), magnetic tape, floppy disk, and optical data storage device, etc.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

One of ordinary skill in the art will understand that the above described embodiments can be implemented by hardware, or software (program codes), or a combination of hardware and software. If implemented by software, it may be stored in the above-described computer-readable media. The software, when executed by the processor can perform the disclosed methods. The computing units and the other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A wireless communication method, comprising:
receiving, by a terminal device, a broadcast message sent by a wireless communication device, the broadcast message including first identification information of the wireless communication device;
sending, by the terminal device, a scan request message to the wireless communication device after receiving the broadcast message;
receiving, by the terminal device, a scan response message sent by the wireless communication device, wherein the scan response message includes second identification information for identifying the wireless communication device;
determining third identification information of the wireless communication device based on the first identification information in the broadcast message and the second identification information in the scan response message;
searching a database based on the determined third identification information of the wireless communication device, the database including a mapping relation between the determined third identification information of the wireless communication device and the physical location of the wireless communication device; and
determining a location of the terminal device based on the physical location of the wireless communication device.

2. The method of claim 1, wherein the first identification information comprises at least one of a Universally Unique Identifier (UUID), a major identifier (Major ID), and a minor identifier (Minor ID).

3. The method of claim 1, wherein the second identification information comprises at least one of a major identifier (Major ID) and a minor identifier (Minor ID).

4. A terminal device, comprising:
a memory storing instructions; and
one or more processors configured to execute the instructions to cause the terminal device to:
receive a broadcast message sent by a wireless communication device, the broadcast message including first identification information of the wireless communication device;
send a scan request message to the wireless communication device after the receiving unit receives the broadcast message, wherein the receiving unit is further configured to receive a scan response message sent by the wireless communication device, and wherein the scan response message includes second identification information for identifying the wireless communication device;
determine third identification information of the wireless communication device based on the first identification information in the broadcast message and the second identification information in the scan response message; and
search a database based on the determined third identification information of the wireless communication device and determine a location of the terminal device, the database including a mapping relation between the determined third identification information of the wireless communication device and the physical location of the wireless communication device.

5. The terminal device of claim 4, wherein the first identification information comprises at least one of a Universally Unique Identifier (UUID), a major identifier (Major ID), and a minor identifier (Minor ID).

6. The terminal device of claim 4, wherein the second identification information comprises at least one of a major identifier (Major ID) and a minor identifier (Minor ID).

7. A non-transitory computer-readable storage medium having stored therein instructions that are executable by one or more processors of a terminal device to cause the terminal device to perform a wireless communication method comprising:
receiving a broadcast message sent by a wireless communication device, the broadcast message including first identification information of the wireless communication device;
sending a scan request message to the wireless communication device after receiving the broadcast message;
receiving a scan response message sent by the wireless communication device, wherein the scan response message includes second identification information for identifying the wireless communication device;
determining third identification information of the wireless communication device based on the first identification information in the broadcast message and the second identification information in the scan response message;
searching a database based on the determined third identification information of the wireless communication device, the database including a mapping relation between the determined identification information of the wireless communication device and the physical location of the wireless communication device; and
determining a location of the terminal device based on the physical location of the wireless communication device.

8. The non-transitory computer readable medium of claim 7, wherein the first identification information comprises at least one of a Universally Unique Identifier (UUID), a major identifier (Major ID), and a minor identifier (Minor ID).

9. The non-transitory computer readable medium of claim 7, wherein the second identification information comprises at least one of a major identifier (Major ID) and a minor identifier (Minor ID).

* * * * *